April 27, 1954
E. G. SCHEIBEL ET AL
2,676,903
FRACTIONAL LIQUID EXTRACTION OF VITAMINS
Filed Feb. 15, 1950
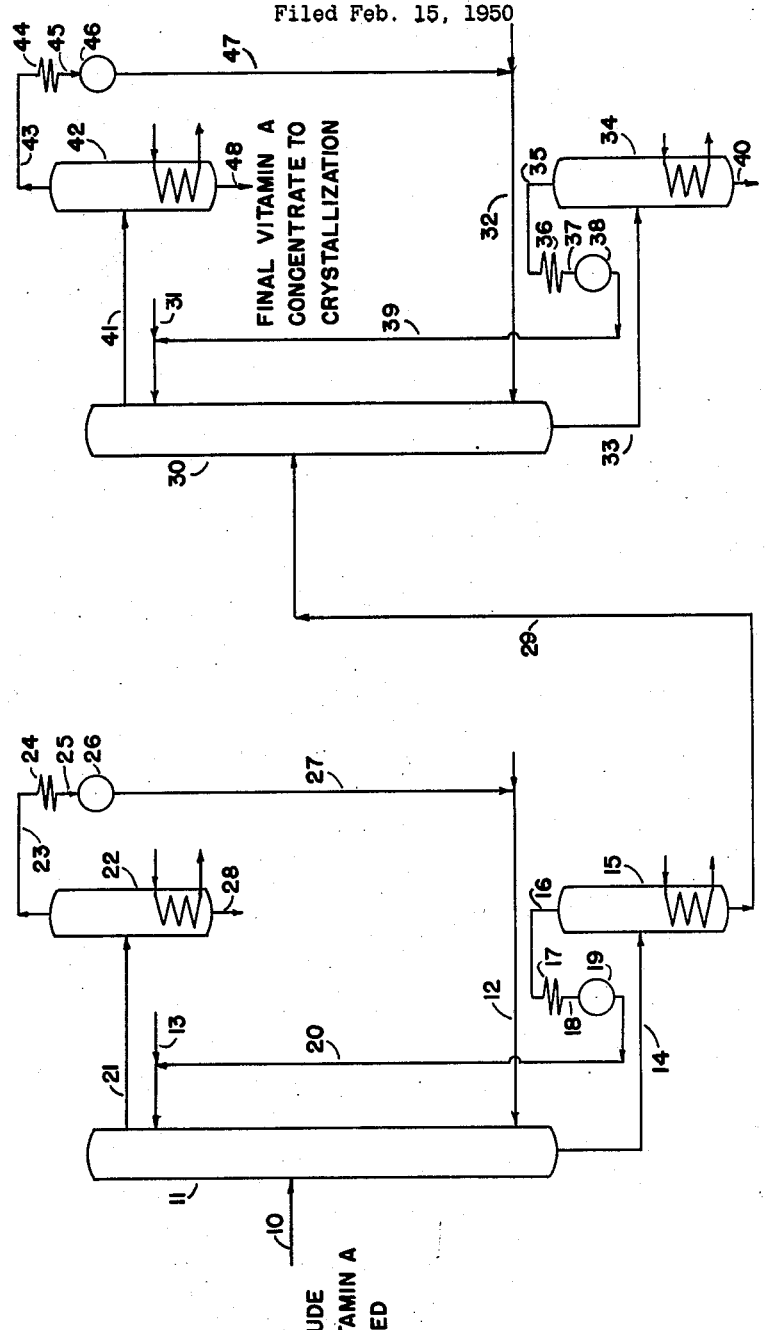
INVENTORS.
EDWARD GEORGE SCHEIBEL
ANDREW E. KARR
BY
ATTORNEYS Patented Apr. 27, 1954

2,676,903

UNITED STATES PATENT OFFICE 2,676,903

FRACTIONAL LIQUID EXTRACTION OF VITAMINS

Edward George Scheibel, Montclair, and Andrew E. Karr, Lyndhurst, N. J., assignors to Hoffmann-La Roche Inc., Nutley, N. J., a corporation of New Jersey Application February 15, 1950, Serial No. 144,326

3 Claims. (Cl. 167—81)

The present invention relates to a process for producing vitamin A active compounds such as vitamin A alcohol and vitamin A esters in highly concentrated or purified form. More particularly, the invention relates to a process for treating materials or mixtures containing vitamin A active compounds as, for example, fish liver oils containing vitamin A, vitamin A concentrates obtained from such natural sources, vitamin A derivatives, such as esters obtained by esterifying vitamin A alcohol from natural sources, and vitamin A-containing products as are obtained in the synthesis of vitamin A active compounds, to remove any biologically inactive materials or impurities associated with the vitamin A active compounds.

According to the process of the present invention, the mixture containing the vitamin A active component and the inactive components or impurities is contacted with two substantially immiscible solvents having different specific gravities and with which the vitamin A active component and the inactive components have different distribution coefficients. The mixture may be, for example, contacted in a column with the solvents in countercurrent flow and with alternate mixing and calming, the mixture being introduced into the column or solvent streams at a point between the points of introduction of the two solvents. A suitable apparatus is that shown in U. S. Patent No. 2,493,265. The solvent ratio is such that two liquid phases are obtained, one phase consisting of one of the solvents containing a fraction rich in the vitamin A active component and also any inactive components more soluble than the vitamin A active component in said solvent, and the other phase consisting of the other solvent in which is dissolved inactive components less soluble than the vitamin A active component in the first mentioned solvent, to the substantial exclusion of the vitamin A active component.

The solvent can then be eliminated from the first-mentioned phase in any suitable manner to obtain the purified vitamin A concentrate. Thus, where the solvent has a low boiling point it can be readily removed from this phase by simple evaporation under reduced pressure without destruction of the vitamin A active component. On the other hand, where the solvent is of such a nature that for its removal by evaporation an elevated temperature would be required such as might cause decomposition of the vitamin A active compound, it is preferred to extract the vitamin A active compound from this phase by simple extraction with a lower boiling solvent which can then be evaporated under vacuum from the extract without destruction of the vitamin A active compound.

The vitamin A concentrate, hereinafter called the first concentrate, obtained from the first-mentioned phase, as already stated, also contains the inactive impurities more soluble in the solvent of this phase than the vitamin A active component. In order to obtain a concentrate of even greater purity and one which will give a maximum yield of crystalline vitamin A active compound, it is preferable to remove these impurities. This is accomplished by subjecting the first concentrate to a second extraction procedure similar to the first extraction procedure with two solvents of the type described, which may be the same solvents as employed in the first extraction step, or different solvents, but in such a solvent ratio that two liquid phases are obtained, one phase being substantially vitamin A-free and consisting of one of the solvents containing the aforesaid impurities of the first concentrate, and the other phase consisting of the other solvent containing the vitamin A active component of the first concentrate.

It is preferred, however, to carry out a second extraction step with the same solvents as employed in the first extraction step but in a different solvent ratio, such that the solvent which extracts the less soluble impurities than the vitamin A active component in the first extraction step is employed in the second extraction step in a larger proportion to the other solvent than it is employed in the first extraction step, in other words, the extraction factor is adjusted to lie on one side of unity in the first step and on the other side of unity in the second step. The extraction factor is the ratio of the amount dissolved in one immiscible solvent to the amount dissolved in the other immiscible solvent. As a result, the vitamin A active component from the first concentrate is now extracted in this solvent, and the more soluble impurities associated with the concentrate are now eliminated in the other solvent.

The solvent from the vitamin A-containing phase obtained in the second extraction step can be eliminated in the same manner as described above in the first extraction step, to yield a high purity concentrate which can then be treated to crystallize the vitamin A active component.

In a preferred embodiment of the invention, the solvents are conducted countercurrently with respect to each other in a column which comprises alternate packed calming and mixing sections with a centrally located shaft upon which are mounted agitators with vertical blades in all the mixing sections. A calming section and a mixing section together constitute a stage and the column is provided with a number of such stages, depending upon the degree of purification desired. The heavier solvent is introduced at the top of the column and flows downward through the packing to the mixing section where it is brought into intimate contact with the lighter solvent by the agitation in the mixing section. It then passes downward to the packed calming section in countercurrent flow to the lighter solvent which is introduced at the bottom of the column and flows upward through the column. The vitamin A mixture to be purified is introduced at an intermediate stage in the column. Thus, the liquids, in their flow through the column, are subjected to alternate intimate mixing and calming, and due to this combination of mixing and countercurrent contacting high extraction efficiencies are obtained.

In general, any solvents which are substantially immiscible, have different specific gravities and with which the vitamin A active components and the inactive components have different distribution coefficients can be employed in the process. Aliphatic hydrocarbon solvents which remain in the liquid state during the extraction process, such as pentanes, hexanes, heptanes, and octanes, as, for example, n-pentane, n-heptane, iso-heptane, n-hexane, iso-octane, 2,2,4-trimethyl-pentane, nonane, and petroleum ether, and naphthenic hydrocarbons, such as cyclohexane, have been found particularly useful as the lighter solvents; while acetonitrile, nitromethane, methyl alcohol, aniline, mixtures of nitromethane and aniline, mixtures of methanol and glycol, and mixtures of glycol and ethylene glycol monomethyl ether, have been found effective as the heavier solvent. The ratio of the solvents employed is varied depending upon the distribution of the vitamin A active component between the different pairs of solvents and the number of extraction stages available in the column. As an example, when the active component is vitamin A acetate, and acetonitrile and heptane are employed in two extraction steps, the solvent ratio in one step may be from about 4 to 15 volumes of acetonitrile per volume of heptane, and in the other extraction step may be from about 1 to 3 volumes of acetonitrile per volume of heptane. When the active component is vitamin A alcohol, the ratio in one step may be from about 0.8 to 3 volumes of acetonitrile per volume of heptane, and in the other extraction step from about 0.1 to 0.4 volume of acetonitrile per volume of heptane. The order of the steps is immaterial. When the sequence is in the order mentioned, the extraction factor is less than one, and the first vitamin A concentrate is recovered from the acetonitrile phase in the first step, and the extraction factor is greater than one, and the final concentrate is recovered in the heptane phase in the second step. If the sequence is in the reverse order, the extraction factor is reversed and the first vitamin A concentrate is recovered in the heptane phase and the final concentrate in the acetonitrile phase.

The accompanying drawing will serve to illustrate the invention. The figure represents a flow diagram for a continuous process for concentrating vitamin A to a sufficient purity for crystallization.

Referring to the figure, the crude vitamin A mixture to be purified is introduced through line 10 to the extraction column 11 where it contacts the lighter solvent introduced through line 12 and the heavier solvent introduced through line 13. In their countercurrent flow through the column, the liquids are subjected to alternate intimate mixing and calming in the mixing and calming sections. The heavy solvent fraction is removed from the bottom of extraction column 11 and introduced through line 14 into an evaporator 15 to evaporate the solvent, thereby forming the first vitamin A concentrate. The concentrate is drawn off from the bottom of the evaporator 15 and treated further as will be hereinafter described, or may be subjected to crystallization if sufficiently freed of impurities. The evaporated solvent is drawn off from the evaporator and introduced through line 16 into a condenser 17 and through line 18 into accumulator 19, and from accumulator 19 is recycled to column 11 through line 20.

The light solvent fraction is removed from the top of column 11 and introduced through line 21 into evaporator 22 where the solution is evaporated to recover the light solvent which is recycled through line 23 into condenser 24, through line 25 into accumulator 26, and through line 27 into the extraction column 11. The impurities are drawn off from evaporator 22 through line 28.

The vitamin A concentrate withdrawn from the evaporator 15 is introduced through line 29 into a second liquid extraction column 30 which may be identical with extraction column 11. The vitamin A concentrate contacts the heavier solvent introduced through line 31 and the lighter solvent introduced through line 32. In their countercurrent flow through the column, the liquids are subjected to alternate intimate mixing and calming in the mixing and calming sections. The heavier solvent fraction is withdrawn from the bottom of column 30 through line 33 into an evaporator 34, where the heavy solvent is evaporated and recycled through line 35, condenser 36, through line 37, accumulator 38, and line 39 to the extraction column 30. The impurities are withdrawn from the evaporator through line 40. The light solvent fraction is removed from the top of column 30 and introduced through line 41 into an evaporator 42, where the light solvent is evaporated from the vitamin A concentrate and recycled through line 43, condenser 44, line 45, accumulator 46, and line 47 to column 30. The vitamin A concentrate is withdrawn from the evaporator through line 48. The concentrate can then be readily crystallized from organic solvents such as ethyl ether, methanol, and mixtures of methanol and ethyl formate.

The following examples will serve to illustrate the invention. The percentage of vitamin A active components stated in the examples is that determined by the well-known Carr-Price reaction.

*Example 1*

100 g. of a vitamin A acetate concentrate derived from natural sources and containing 21% of vitamin A acetate were fed continuously into the center of a 40-stage liquid extraction column 11, as hereinabove described, through which acetonitrile introduced at the top of the column and heptane introduced at the bottom of the column were passed countercurrently in a volume ratio of 9.4 to 1. A total of 6,670 cc. of acetonitrile phase and 710 cc. of heptane phase were collected. In their countercurrent flow through the column, the liquids were subjected to alternate intimate mixing and calming. A yield of 34.0 grams of a first vitamin A concentrate containing 50.3% of vitamin A acetate was obtained from the acetonitrile solution withdrawn from the bottom of the column, after evaporation of the acetonitrile in vacuo at 25° C. 60 g. of impurities containing about 3% vitamin A acetate were obtained from the heptane solution withdrawn from the top of the column, after evaporation of the heptane. The amount of vitamin A acetate in the heptane solution can be decreased by introducing additional stages in the column. The balance of vitamin A acetate remained in the column as holdup.

For further purification, 27.3 grams of the 50.3% vitamin A acetate concentrate were introduced continuously into the center of the second extraction column 30 which has the same number of extraction stages as column 11 and through which the same solvents, acetonitrile and heptane introduced at the top and bottom, respectively, of the column, were circulated at a ratio of 1.8 volumes of acetonitrile to one volume of heptane. A total of 2,380 cc. of acetonitrile phase and 1,340 cc. of heptane phase were collected. After vacuum evaporation of the heptane solution withdrawn from the top of this column, a concentrate containing 66% of vitamin A acetate was recovered. This concentrate was then subjected to crystallization by dissolving it in ethyl ether, in a solvent to concentrate ratio of 1 cc. of ethyl ether per gram of concentrate, and cooling for 18 hours at —60° C. The crystals of vitamin A acetate obtained were substantially pure.

The residue from the acetonitrile solution contained practically all of the odoriferous compounds in the natural concentrate. The final concentrate had only a trace of the disagreeable fish odor present in the original feed, and the crystals produced from this final product gave none of the odor associated with the natural concentrate.

Example 2

100 g. of a crude synthetic vitamin A acetate product containing 30% of synthetic vitamin A acetate were introduced continuously into the center of column 11 containing 40 stages employing as solvents acetonitrile and heptane in a volume ratio of 11.7 to 1. A total of 7,380 cc. of acetonitrile phase and 675 cc. of heptane phase were collected. In their countercurrent flow through the column, the liquids were subjected to alternate intimate mixing and calming. The acetonitrile solution withdrawn from the bottom of the column, upon evaporation of the acetonitrile which is recycled to the column, gave a concentrate of 72.1 grams containing 33% of vitamin A acetate, and the heptane solution withdrawn from the top of the column after vacuum evaporation of the heptane which is recycled to the column, yielded a residue of 21.7 grams containing about 4% of vitamin A acetate. The amount of vitamin A acetate in this residue can be decreased by including additional stages in the extraction column.

For further purification, 45 grams of the concentrate obtained from the acetonitrile solution were introduced into extraction column 30 wherein acetonitrile and heptane were employed in the solvent ratio of 2.3 volumes of acetonitrile to one volume of heptane. A total of 4,150 cc. of acetonitrile phase and 1,810 cc. of heptane phase were collected. The residue from the acetonitrile phase after vacuum evaporation of the acetonitrile amounted to 16.4 grams and also contained about 4% of vitamin A acetate. The concentrate from the heptane phase after vacuum evaporation of the heptane amounted to 20 grams and contained 55% of vitamin A acetate. The concentrate was crystallized by dissolving it in ethyl ether, in a solvent to concentrate ratio of 1 cc. of ether per gram of concentrate and cooling to —60° C. for 18 hours.

Example 3

100 g. of a crude synthetic vitamin A acetate product containing 63.8% of vitamin A acetate were introduced continuously into column 11 containing 40 stages, employing as solvents acetonitrile and heptane in a solvent ratio of 8.9:1 on a volume basis. A total of 6,640 cc. of acetonitrile phase and 750 cc. of heptane phase were collected. The acetonitrile solution withdrawn from the bottom of the column upon evaporation of the acetonitrile, gave a concentrate of 70.5 grams containing 69.4% of vitamin A acetate. The heptane solution withdrawn from the top of the column yielded 19 grams of a residue containing about 34.8% of vitamin A acetate after evaporation of the heptane. It was determined that only about 4.7% of this residue was actually biologically active vitamin A acetate and that the remainder was due to the presence of anhydrous vitamin A which although biologically inactive is recorded by the Carr-Price reaction. The amount of biologically active vitamin A acetate in this residue can be further decreased by including additional stages in the extraction column.

For further purification, 69 grams of the first concentrate obtained from the acetonitrile solution were introduced into extraction column 30 wherein acetonitrile and heptane were employed in a solvent ratio of 1.2 volumes of acetonitrile per volume of heptane. A total of 3,070 cc. of acetonitrile phase and of 2,530 cc. of heptane phase were collected. The residue from the acetonitrile solution, after vacuum evaporation, amounted to 7.5 grams and contained less than 2.4% of the vitamin A acetate. The concentrate from the heptane solution, after vacuum evaporation, amounted to 57.5 grams and contained 75.2% vitamin A acetate. 10 g. of this concentrate were crystallized by dissolving it in a 50% methyl alcohol-50% ethyl formate mixture, in a solvent to concentrate ratio of 1 cc. of the solvent per gram of the concentrate, and cooling to —30° for 48 hours. A yield of 4.1 grams of substantially pure crystals, or 55% of the vitamin A acetate in the concentrate, was obtained. On the other hand, crystallization of 10 grams of the original vitamin A acetate feed from the same methyl alcohol-ethyl formate solvent gave 1.2 grams of vitamin A acetate or about 19% of the vitamin A acetate as a crystalline product. Thus, the fractional liquid extraction process more than doubled the yield of crystalline vitamin A acetate that can be obtained from the original starting material.

While other combinations of solvents may be employed in the above examples, the use of heptane and acetonitrile is preferred because of their low boiling points, their relatively non-corrosive nature, and the ability of the two phases to separate readily. The use of other solvents is illustrated by the following examples.

Example 4

100 g. of a crude synthetic vitamin A acetate product containing 30% of vitamin A acetate was treated as in Example 1 in the first extraction stage in a volume ratio of about 4.5 volumes of nitromethane per volume of heptane. The nitromethane phase containing the vitamin A acetate was extracted with heptane in the volume ratio of one volume of heptane per volume of nitromethane in the phase and the heptane extract evaporated under vacuum to recover the vitamin A acetate concentrate. The resulting concentrate of vitamin A acetate was then treated in the second extraction step with heptane and nitromethane in the solvent ratio of 2.6 volumes of nitromethane per volume of heptane. On evaporating the heptane from the heptane phase, a vitamin A residue containing 52% of vitamin A acetate was obtained.

Example 5

100 g. of a crude synthetic vtiamin A acetate product containing 30% of vitamin A acetate was treated as in Example 2 in the first extraction step with a mixture of 20% ethylene glycol-80% methanol and heptane in a volume ratio of 11 volumes of the glycol-methanol solution per volume of heptane. The heptane was evaporated from the hetpane phase and the concentrate of vitamin A acetate thus obtained was then treated as in the second extraction step with heptane and acetonitrile in a solvent ratio of 8.2 volumes of acetonitrile per volume of heptane. On evaporating the solvent from the acetonitrile solution, the residue contained 50% of vitamin A acetate. This example illustrates the employment of different pairs of solvents in the two extraction steps.

Example 6

The procedure of Example 4 was repeated with 100 grams of the crude synthetic vitamin A product employing as the two solvents, heptane and a 20% aniline-80% nitromethane solution as the second solvent. The heptane and aniline-nitromethane solution were employed in a volume ratio of 6.4 volumes of the aniline-nitromethane solution per volume of heptane in the first extraction step. The aniline-nitromethane phase obtained in the first extraction step was extracted with heptane to recover the vitamin A acetate, and after evaporating the heptane from the extract the resulting concentrate was subjected to the second extraction step in which 1.04 volumes of the aniline-nitromethane solution per volume of heptane was employed. On evaporation of the heptane from the heptane phase obtained in the second extraction step, the final concentrate contained 40% of vitamin A acetate.

Example 7

101 grams of a synthetic vitamin A alcohol product containing 28.6% of vitamin A alcohol were introduced continuously into column 11 containing 40 stages, employing as solvents acetonitrile and heptane in a solvent ratio of 1.48:1 on a volume basis. A total of 4,600 cc. of acetonitrile phase and 3,100 cc. of heptane phase where collected. The acetonitrile solution withdrawn from the bottom of the column, upon evaporation of the acetonitrile, gave a concentrate of 39.8 grams containing 38.4% of vitamin A alcohol. The heptane solution withdrawn from the top of the column yielded 57.6 grams of a residue containing about 20.6% of vitamin A alcohol after evaporation of the heptane. It was determined that only about 2.8% of this residue was actually biologically active vitamin A alcohol, and the remainder was due to the presence of anhydrous vitamin A, which although biologically inactive, is recorded by the Carr-Price reaction.

For further purification, 36.8 grams of the first concentrate from the acetonitrile phase were introduced into extraction column 30, wherein acetonitrile and heptane were employed in a solvent ratio of 0.25 volume of acetonitrile per volume of heptane. A total of 850 cc. of acetonitrile phase and 3,360 cc. of heptane phase were collected. The residue from the acetonitrile solution, after vacuum evaporation, amounted to 5.5 grams and contained 4.0% of vitamin A alcohol. The concentrate from the heptane solution, after vacuum evaporation, amounted to 28.5 grams and contained 40.6% of vitamin A alcohol.

Due to the higher boiling points of the heavier solvents employed in Examples 4 and 6, the phase containing the vitamin A acetate obtained in the first extraction step is first subjected to simple extraction with a lower boiling solvent, followed by evaporation of the solvent, prior to applying the second extraction step to the resulting first vitamin A acetate concentrate thus obtained. Thus, these procedures are more involved than when employing heptane and acetonitrile as the solvents. Accordingly, use of the latter two solvents is preferred.

We claim:

1. A process for purifying a mixture of a vitamin A active material selected from the group consisting of vitamin A alcohol and its esters and non-active impurities associated therewith which comprises (1) contacting said mixture in a first multi-stage extraction zone with two substantially immiscible countercurrently flowing liquid organic solvents which have different specific gravities and between which the vitamin A active material and the non-active impurities have different distribution coefficients, said mixture being introduced into the solvent streams at a point approximately midway between the points of introduction of the two solvents, the extraction factor of said vitamin A active material with respect to said solvent pair in said first extraction zone being less than one; (2) withdrawing a first extract stream comprising vitamin A active material in the heavy solvent and separately withdrawing a second extract stream comprising the light solvent and impurities; (3) separating the heavy solvent from the first extract stream to obtain a first vitamin A concentrate; (4) contacting said concentrate in a second multi-stage extraction zone with the same two solvents in countercurrent flow, said concentrate being introduced into the solvent streams at a point approximately midway between the points of introduction of the two solvents, the extraction factor of the vitamin A active material with respect to the solvent pair in the second extraction zone being greater than one; (5) withdrawing a third extract stream which comprises vitamin A active material in said light solvent and a separate extract stream which comprises the said heavy solvent and impurities; (6) separating the light solvent from said third extract stream to obtain a vitamin A concentrate having a greater percentage content of vitamin A active material than the original feed.

2. A process for purifying a mixture of vitamin

A acetate and impurities associated therewith comprising (1) contacting said mixture in a first multi-stage extraction zone with n-heptane and acetonitrile flowing countercurrently to each other, said mixture being introduced into the solvent streams at a point approximately midway between the points of introduction of the two solvents, the solvent ratio being from about 4 to about 15 volumes of acetonitrile per volume of n-heptane and the extraction factor of said vitamin A acetate with respect of said solvents being less than one; (2) withdrawing a first extract stream comprising vitamin A acetate in acetonitrile and separately withdrawing a second extract stream comprising n-heptane and impurities; (3) separating the acetonitrile from the first extract stream to obtain a first vitamin A concentrate; (4) contacting said concentrate in a second multi-stage extraction zone with the same two solvents in countercurrent flow, said concentrate being introduced into the solvent streams at a point approximately midway between the points of introduction of the two solvents, the solvent ratio in this second extraction zone being from about 1 to about 3 volumes of acetonitrile per volume of n-heptane and the extraction factor of the vitamin A acetate with respect to the solvent pair in the second extraction zone being greater than one; (5) withdrawing a third extract stream comprising vitamin A acetate in n-heptane and a separate extract stream comprising acetonitrile and impurities; (6) separating the n-heptane from said third extract stream to obtain a vitamin A concentrate having a greater percentage content of vitamin A acetate than the original feed.

3. A process for purifying a mixture of vitamin A alcohol and impurities associated therewith comprising (1) contacting said mixture in a first multi-stage extraction zone with n-heptane and acetonitrile flowing countercurrently to each other, said mixture being introduced into the solvent streams at a point approximately midway between the points of introduction of the two solvents, the solvent ratio being from about 0.8 to about 3 volumes of acetonitrile per volume of n-heptane and the extraction factor of said vitamin A alcohol with respect to said solvents being less than one; (2) withdrawing a first extract stream comprising vitamin A alcohol in acetonitrile and separately withdrawing a second extract stream comprising n-heptane and impurities; (3) separating the acetonitrile from the first extract stream to obtain a first vitamin A concentrate; (4) contacting said concentrate in a second multi-stage extraction zone with the same two solvents in countercurrent flow, said concentrate being introduced into the solvent streams at a point approximately midway between the points of introduction of the two solvents, the solvent ratio in this second extraction zone being from about 0.1 to about 0.4 volumes of acetonitrile per volume of n-heptane and the extraction factor of the vitamin A alcohol with respect to the solvent pair in the second extraction zone being greater than one; (5) withdrawing a third extract stream comprising vitamin A alcohol in n-heptane and a separate extract stream comprising acetonitrile and impurities; (6) separating the n-heptane from said third extract stream to obtain a vitamin A concentrate having a greater percentage content of vitamin A alcohol than the original feed.

References Cited in the file of this patent

UNITED STATES PATENTS

| Number | Name | Date |
|---|---|---|
| 2,090,738 | Tischer | Aug. 24, 1937 |
| 2,111,360 | Cutting | Mar. 15, 1938 |
| 2,154,713 | Van Wijk | Apr. 18, 1939 |
| 2,200,391 | Freeman | May 14, 1940 |
| 2,278,309 | Freeman | Mar. 31, 1942 |
| 2,291,461 | Freeman | July 28, 1942 |
| 2,329,889 | Ewing | Sept. 21, 1943 |
| 2,347,460 | Buxton | Apr. 25, 1944 |
| 2,355,605 | Ruthruff | Aug. 15, 1944 |
| 2,380,418 | Dombrow | July 31, 1945 |
| 2,573,902 | Gloyer | Nov. 6, 1951 |

OTHER REFERENCES

Serial No. 379,550, Grandel (A. P. C.), published May 11, 1943.